United States Patent [19]

Chen et al.

[11] Patent Number: 4,841,184

[45] Date of Patent: Jun. 20, 1989

[54] VELOCITY AND IMBALANCE OBSERVER CONTROL CIRCUIT FOR ACTIVE MAGNETIC BEARING OR DAMPER

[75] Inventors: Hsiang M. Chen, Latham; Martin W. Eusepi, Rexford; Robert E. Johnson, Ballson Spa, all of N.Y.

[73] Assignee: Mechanical Technology Incorporated, Latham, N.Y.

[21] Appl. No.: 65,574

[22] Filed: Jun. 23, 1987

[51] Int. Cl.[4] .............................................. F16C 39/06
[52] U.S. Cl. ................................... 310/90.5; 318/616; 324/208
[58] Field of Search ................. 310/90.5, 51; 324/208; 318/615, 616, 617, 632, 460

[56] References Cited

U.S. PATENT DOCUMENTS

| 4,128,795 | 12/1978 | Habermann | 318/616 |
| 4,629,262 | 12/1986 | Hamilton | 310/90.5 |
| 4,691,152 | 9/1987 | Ell | 318/616 |

FOREIGN PATENT DOCUMENTS

| 0085280 | 7/1978 | Japan | 318/616 |
| 0065415 | 4/1982 | Japan | 310/90.5 |
| 0065416 | 4/1982 | Japan | 310/90.5 |

Primary Examiner—R. Skudy
Attorney, Agent, or Firm—Joseph V. Claeys; Joseph C. Sullivan

[57] ABSTRACT

"Velocity Observer" and "Imbalance Observer" circuits are used to control the journals in the magnetic field of an attractive type active magnetic bearing and/or damper. The circuits are characterized by the use of integrators rather than differential components. The velocity observer circuit uses a position feedback loop and a velocity observer feedback loop, both with variable gain, to control the levitation of the journal in the magnetic field. The imbalance observer circuit recreates the journal acceleration directly from the displacement measurement and can be used optionally on-line and off-line to suppress vibrations.

4 Claims, 6 Drawing Sheets

VELOCITY AND IMBALANCE OBSERVER CONTROL CIRCUIT FOR ACTIVE MAGNETIC BEARING OR DAMPER

BACKGROUND OF THE INVENTION

1. Field of the Invention

This invention relates to a velocity observer electronic control circuit and an imbalance observer electronic control circuit for an active magnetic damper or bearing.

2. Description of The Prior Art

In order to destabilize the journals in the magnetic field of an attractive type active magnetic bearing and-/or damper, control feedback of both the journal displacement and velocity are necessary. In the prior art generally, the displacement has been measured and has been processed by a differentiator or phase-lead circuit to achieve the velocity information. However, the process of differentiation tends to be noisy and unreliable.

Japanese Patent Nos. 57-65415 (A) and 57-65416 (A) differ from the prior art in applying a feedback control current based on integration rather than differentiation. These two Japanese patents are similar in that their reason for applying the current integration feedback was to eliminate the "position drift". This has the effect of making the bearing statically stiff. However, both patents describe circuits which have a separate phase compensation element which indicates that the current integration itself does not provide for phase compensation. The main difference between the two patents is that the latter one provides control of two opposite coils instead of one.

SUMMARY OF THE PRESENT INVENTION

It is a primary objective of the present invention to provide a system wherein both the imbalance observer and velocity observer control circuits for a journal rotating in a magnetic field are based on integration of sensed displacement of the journal.

These and other objects and advantages of the invention will become apparent from the following description.

In the circuit design of the present invention, there is a velocity observer which applies integration instead of differentiation, which is relatively noise free and is intended for replacing the function of a differentiator or the phase-lead circuit.

When the journal of an active magnetic bearing or damper vibrates under large imbalance forces it has been the practice to make the magnetic device "soft" at the rotating frequency so that the journal can rotate about its inertial center. However, this practice does not protect the tight clearance locations in a machine. In the circuit of the present invention, there is an imbalance observer which generates a rotating force in the magnetic device to counteract or cancel the imbalance force. This provides a means to limit the vibration excursions of the rotor and protect the tight clearance locations from rubbing. The imbalance observer circuit also dampens the asynchronous vibration which can be caused by rotor instability or fractional whirl.

The velocity and imbalance observer circuits of the present invention are designed for controlling one independent direction of journal motion. Two identical modules of the circuit of the present invention are used for a bearing or damper and can be independently tuned to suit the needs of each directional control.

In the configuration of the present invention four sets of coil pairs are mounted on the stator of the device around the journal. The top and bottom pairs are shown in FIG. 2. They are used to control the vertical position of the journal while the remaining two coil pairs are used to control the horizontal position. In the present invention the vertical and the horizontal controls are completely independent of each other. The control electronics for each comprise identical components which are tuned differently by adjusting various potentiometers in the circuit.

The control scheme for the circuit of the present invention, which as stated previously is identical for both the vertical and horizontal directions, is shown in general form in FIG. 3. The imbalance observer portion of the circuit works directly from the journal displacement. The velocity observer portion of the circuit obtains the general velocity information through both the displacement measurement and the measured control current. As shown in FIG. 3, both the imbalance observer and velocity observer circuits are based on integration.

It should be clear from the above that the basic control scheme of the present invention, which is necessary for levitating the journal in the magnetic field, consists of two feedback loops. One is concerned with position feedback and the other is concerned with velocity observer feedback. One of the essential features of the invention is that the velocity observer circuit provides velocity information without performing differentiation of the displacement measurement. By adjusting the gain of the position feedback loop through a single potentiometer one can proportionately vary the bearing stiffness of the device, and thus set the journal natural frequency (critical speed) at a desired frequency location. Similarly, by adjusting one potentiometer associated with the velocity gain one can vary the damping ratio of the natural vibration mode or the critical speed.

The imbalance observer portion of the circuit can be used optionally on-line or off-line in the feedback control. It recreates the journal acceleration from the displacement measurement without performing differentiations. The control feedback of the imbalance observer output essentially creates a counteracting force in the device to cancel a dynamic force such as the imbalance of a rotating shaft acting on the journal. An imbalance observer can be switched on-line to suppress the vibration amplitude without causing control instability. There is likewise an adjustable gain associated with this optional feedback. The larger the gain is the better the vibration suppression will be.

It is important to note that the vibration suppressing capability of the imbalance observer is not limited to synchronous vibration but is applicable at all frequencies because it observes the journal acceleration with no discrimination as to frequency.

DETAILED DESCRIPTION OF THE INVENTION

Figure 1:
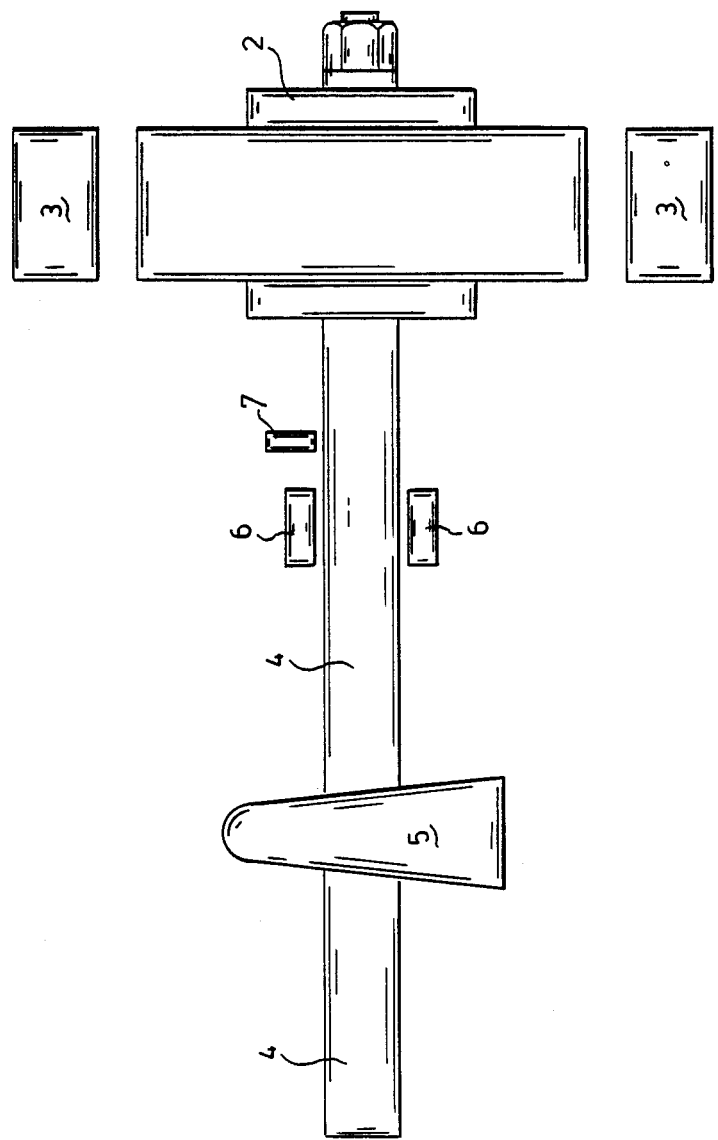
FIG. 1 is an elevational view of the journal which is controlled by the circuits of the present invention.

As shown in FIG. 1, the journal controlled by the circuits of the present invention comprises a rotor 2 and a multi-pole stator 3. The rotor is driven by a shaft 4. The shaft is supported at the driving end by a deep groove ball bearing 5. The ball bearing also absorbs any incidental thrust loads which may be generated during rotation.

The rotor 2 may be driven by a jack shaft which is in turn driven by a variable speed motor (not shown) with a typical maximum speed of 1,800 rpm. Sets of timing belts and pulleys (also not shown) may be used to increase the maximum speed of the jack shaft. Other elements shown in FIG. 1 include vibration limiter 6 and capacitor probe 7.

Figure 2:
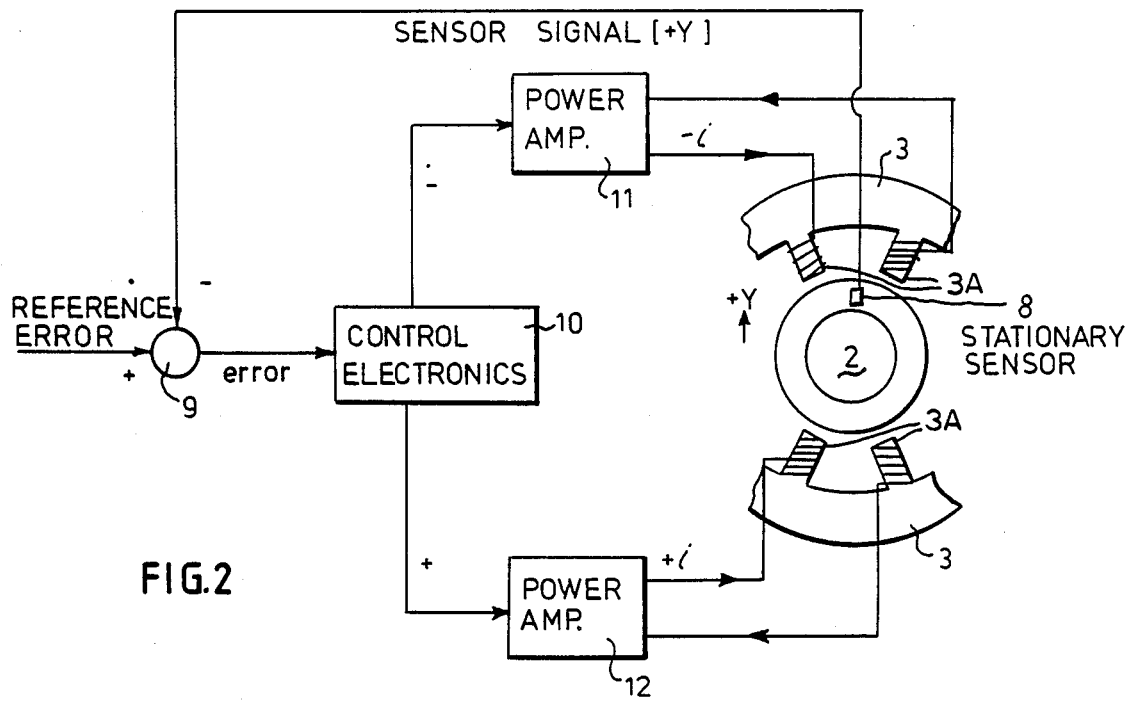
FIG. 2 is a general schematic of the feedback control circuits of the invention.

The general block diagram schematic of FIG. 2 shows that each stator segment has a set of coil pairs. The top and the bottom pairs are shown here. These are used to control the vertical position of the journal and the remaining two pairs control the horizontal position. Thus the vertical and the horizontal controls are completely independent of each other. The control electronics are identical except that they are tuned differently by adjusting potentiometers in the circuits.

As shown in FIG. 2, a stationary sensor 8 delivers a displacement sensor signal to summer 9 where it is combined with a reference signal to generate an error signal which in turn is sent to control electronics module 10. The control electronics module 10 sends correction signals to power amplifiers 11 and 12 which in turn send regulating currents $+i$ and $-i$ to the stator coil 3a. The $+y$ refers to journal displacement.

Figure 3:
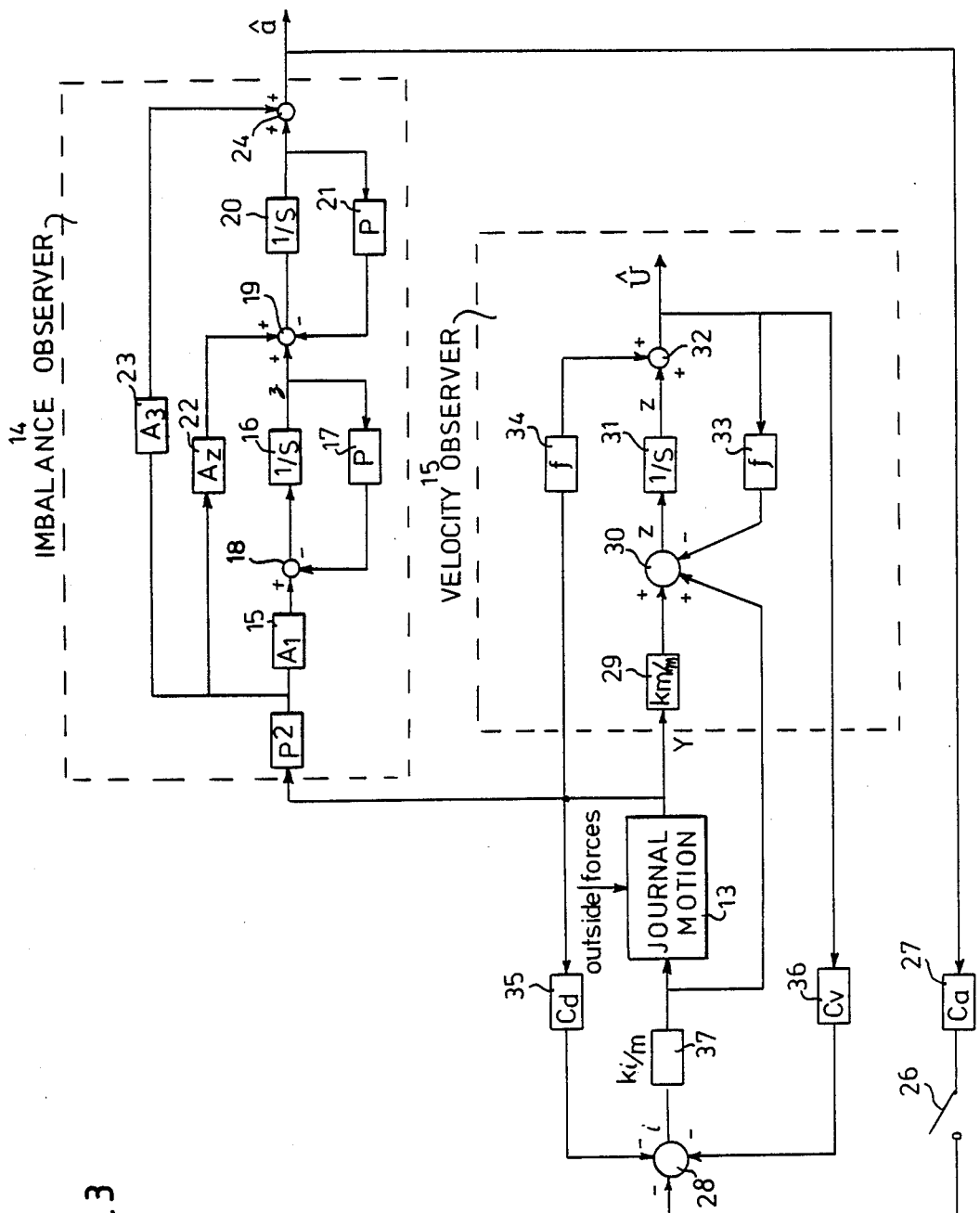
FIG. 3 is a general schematic of the control circuits of the present invention showing their integrational features.

The system block diagram of FIG. 3, which would be identical for either horizontal or vertical control, has an input from outside forces acting onto the journal at module 13. The output of module 13 is conveyed to both imbalance observer circuit 14 and velocity observer circuit 15. The displacement signal from module 13 enters the imbalance observer circuit through an element designated as $P^2$, passes through amplifier 15 and summer 18 and enters integrator 16. Integrator 16 has a feedback path through element 17 to summer 18. The output signal from integrator 16 is also fed to summer 19 where it is combined with a signal from amplifier 22. This signal then passes through a second integrator 20 which has a feedback path to summer 19 through element 21. The output signal from integrator 20 is sent to summer 24 where it is added with a signal from amplifier 23 and then passes from the circuit.

A very important optional feedback path exists through gain module 27 and switch 26 to summer 28. This optional feedback can be switched on-line to suppress vibration amplitude. The results of this suppression are shown on the graph of FIG. 7.

As can be seen from above, the imbalance observer circuit recreates the journal acceleration from the displacement measurement without performing double differentiation.

As stated previously the vibration suppression capability of the imbalance observer is not limited to synchronous frequencies.

Also as shown in FIG. 3, the signal from journal motion module 13 passes into the velocity observer circuit 15 and amplifier 29, then is conveyed to summer 30, and on to integrator 31. The output from integrator 31 enters summer32 which has a feedback path to summer 30 through element 33. Summer 32 also has an input from element 34. The input from element 34 is the measured displacement. Element 34 is a feedforward loop generating part of the velocity information.

The important outputs of the velocity observer circuit 15 are conducted to gain modules 35 and 36. Module 35 imposes a gain $C_d$ on the position feedback and module 36 imposes a gain for the velocity observer output feedback of $C_v$. These feedback signals are conveyed to summer 28 which produces the correction current $+i$. By changing the gain $C_d$ (by adjusting a single potentiometer) one can proportionately vary the bearing stiffness of the device, and thus set the journal natural frequency (critical speed) at a desired frequency location. Similarly, by adjusting one potentiometer associated with the velocity gain $C_v$, one can vary the damping ratio of the natural vibration mode or the critical speed. A path from summer 28 exists through amplifier 37 to journal motion module 13.

Figure 4:
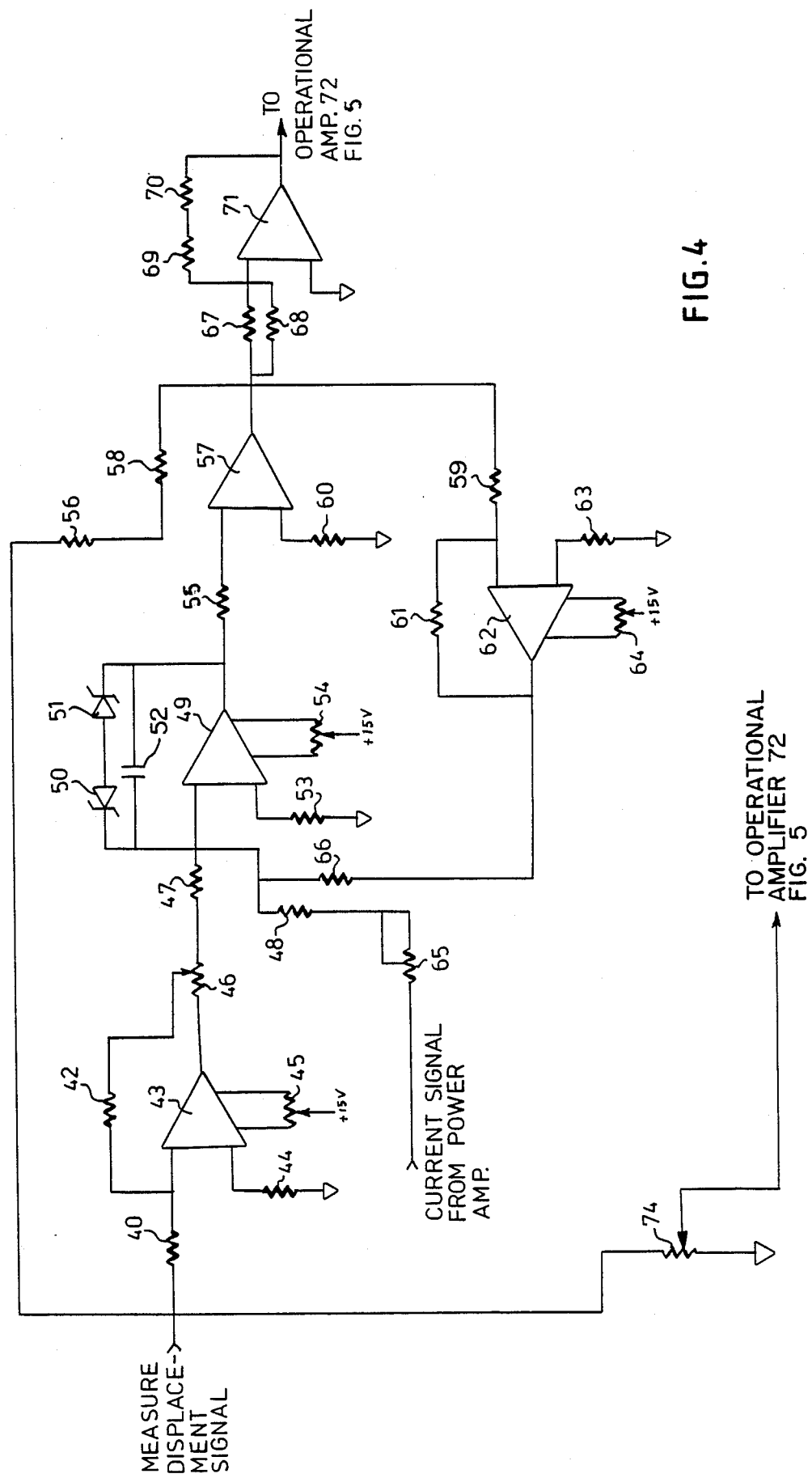
FIG. 4 is a schematic of the velocity observer circuit of the pres invention.

FIG. 4 shows a detailed diagram of the velocity observer circuit of the present invention. As shown therein a measured displacement signal enters resistor 40 and is conveyed to operational amplifier 43 which has associated with it shunt resistor 42, resistor 44 which leads to ground, and shunt resistor 45. The signal thereupon passes to potentiometer 46 which functions to set the maximum gain. It thereupon passes through resistor 47 to operational amplifier 49 which has associated with it shunt capacitor 52 and zener diodes 50 and 51, as well as shunt resistor 54 and resistor 53 which leads to ground. The signal thereupon passes through resistor 55 and reaches operational amplifier 57. Operational amplifier 57 also has a direct input from the measured displacement signal through resistor 56. Associated with operational amplifier 57 are shunt resistor 58 and resistor 60 which leads to ground.

The signal then passes through resistors 67, 68 to operational amplifier 71. Operational amplifier 71 has a direct connection to ground and also has a series combination of resistor 69 and potentiometer 70 connected in shunt with it. Potentiometer 70 regulates the position velocity observer output feedback gain signal mentioned in connection with gain modules 36 of FIG. 3. This position gain signal is then conveyed to a summing operational amplifier 72 shown in FIG. 6.

Another input to the velocity observer circuit passes through potentiometer 65 and resistor 48 to operational amplifier 49. Potentiometer 65 functions to set a minimum gain. It then of course proceeds to the output of operational amplifier 71 as previously described.

Another branch of the circuit is the feedback branch from operational amplifier 57 through resistor 59 to operational amplifier 62. This amplifier has associated with it resistor 63, which runs to ground, as well as shunt resistors 61 and 64. The signal from this operational amplifier passes through resistor 66 to feed into operational amplifier 49.

Potentiometer 74 is representative of position feedback gain and corresponds to element 35 of FIG. 3. It also leads to operational amplifier 72 of FIG. 5.

As the rotor is displaced from its reference center, it will experience a force due to the existing magnetic field and another magnetic force due to the control current. These two forces correspond to the two rotor acceleration resistors at 47 and 48. Amplifier 49 and capacitor 52 integrate the acceleration signal to achieve the rotor velocity.

Figure 5:
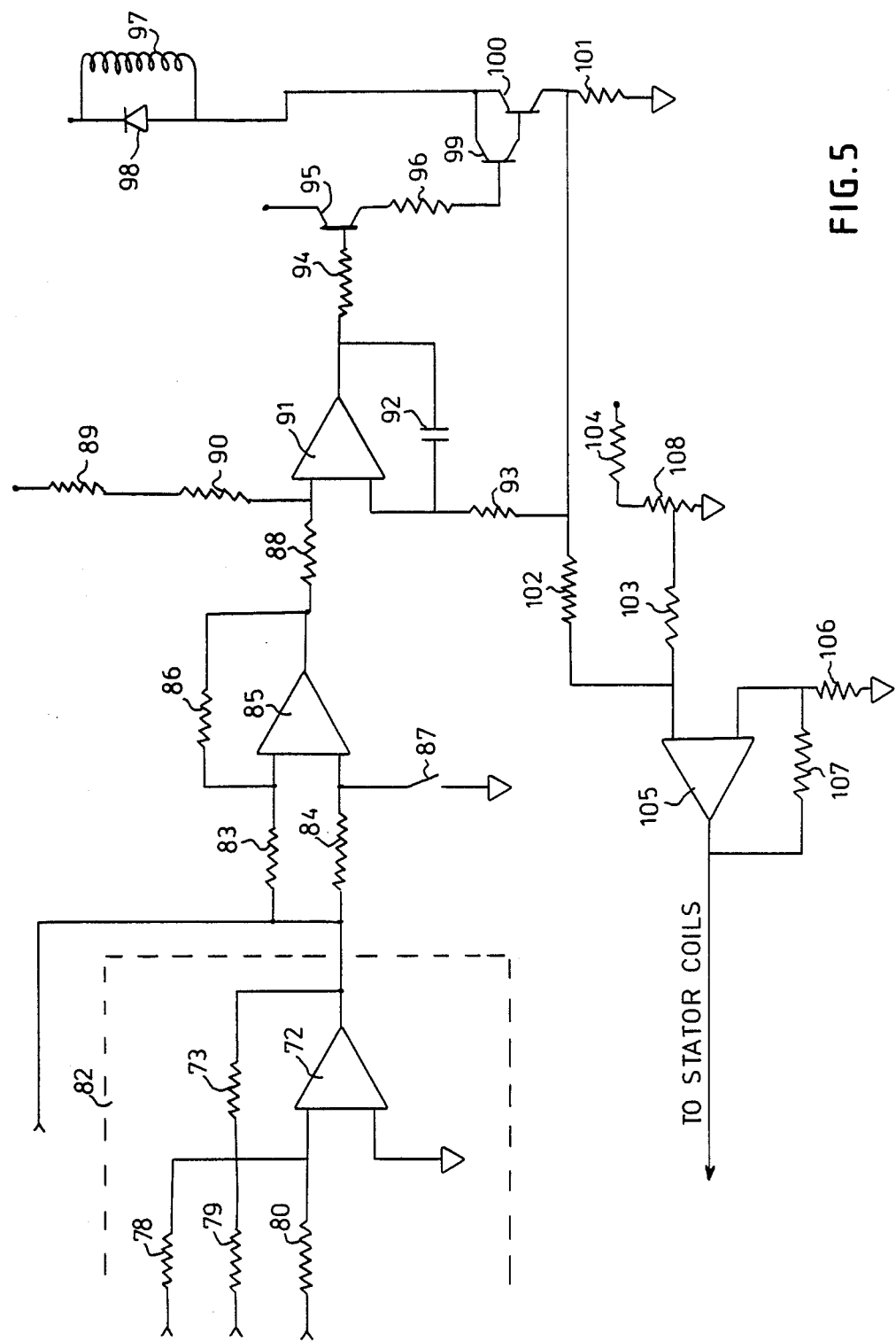
FIG. 5 is a schematic showing the driver control circuit of the present invention.

FIG. 5 is a schematic of the driver circuitry which acts upon input from the velocity observer circuits and imbalance observer circuits to produce corrective signals for the journal position. As shown therein operational amplifier 72 has three inputs; one from operational amplifier 71 of FIG. 4 through resistor 78, another from element 81 of FIG. 6 through resistor 79, and a third from element 74 of FIG. 4 through resistor 80. After leaving operational amplifier 72, the signal proceeds to two identical driver circuits for two opposite stator coils. Only one of the two driver circuits is shown in details in FIG. 5. Each driver circuit starts with a parallel combination of resistors 83 and 84 to operational amplifier 85. Operational amplifier 85 has associated with it shunt resistor 86 and switch 87 which leads to ground. The on-off position switch determines the sign of the control signal. The signal then proceeds through resistor 88 to operational amplifier 91. Operational amplifier 91 also has a bias input through resistors 89 and potentiometer 90. Also associated with operational amplifier 91 is a shunt capacitor 92.

The signal then proceeds through resistor 94, transistor 95, resistor 96 and the series combination of transistors 99 and 100. A tuning circuit comprising a parallel combination of an inductor 97 and a diode 98 are used to bias the collector terminal of transistors 99 and 100. A resistor 101 is connected between the emitter of transistor 100 and ground.

A feedback path also exists, the fundamental component of which is operational amplifier 105. Amplifier 105 is fed by resistors 102, 103, 93, as well as resistor 106. The shunt resistor 107 is connected around operational amplifier 105. A potentiometer 108 is connected in series with resistors 103 and 104. The output signal of operational amplifier 105 is used to directly drive the stator coil.

Figure 6:
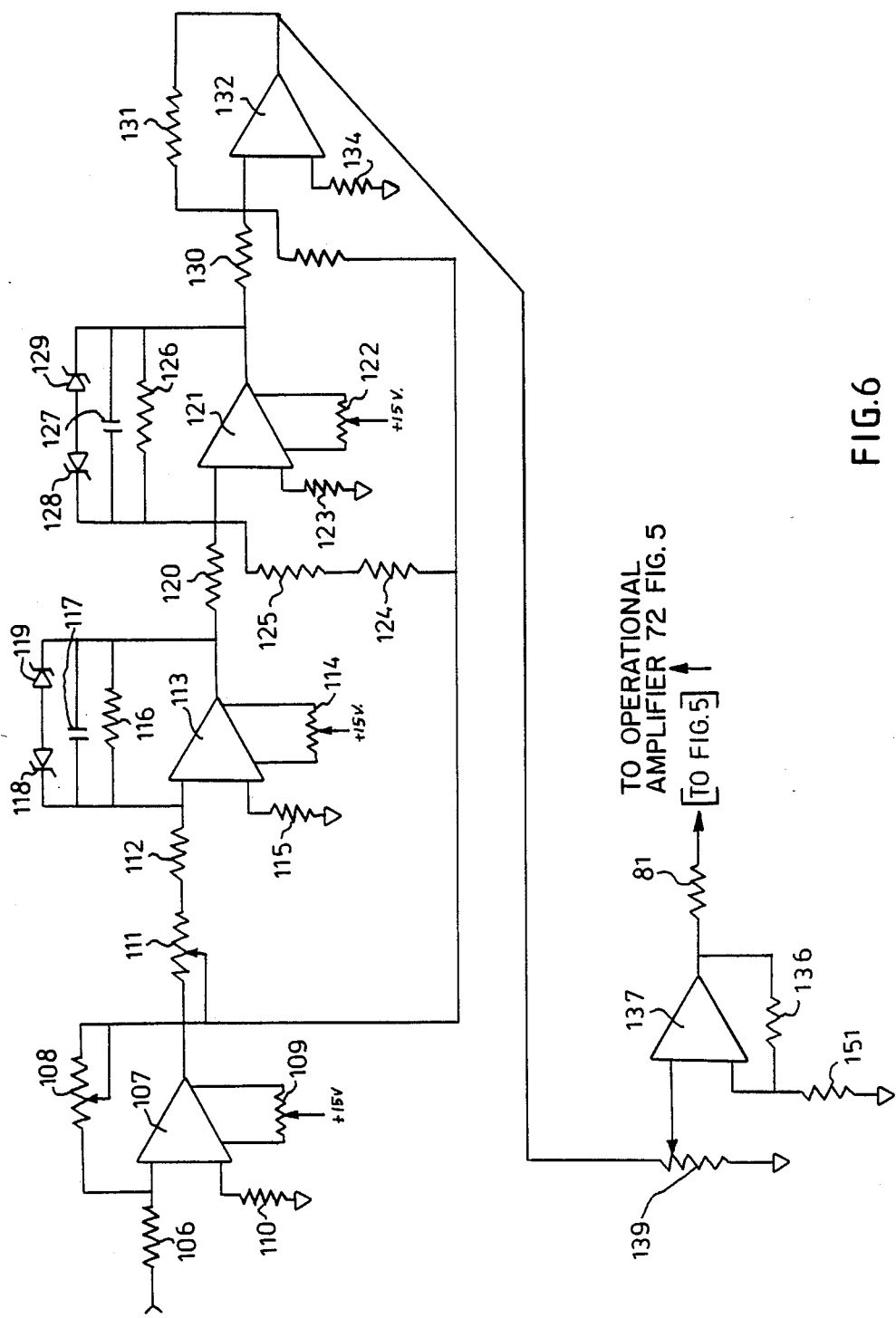
FIG. 6 is a schematic of the imbalance observer circuit of the invention.

FIG. 6 is directed to the imbalance observer circuit of the present invention. As shown therein, the measured displacement signal passes through resistor 106 to operational amplifier 107. Operational amplifier 107 has associated with it shunt potentiometer 108 and shunt resistor 109, as well as resistor 110 which terminates at ground.

The signal then passed through potentiometer 111 which was used to set a minimum gain level. It then reaches operational amplifier 113 through resistor 112. Associated with operational amplifier 113 are a parallel combination of resistor 116, capacitor 117, and zener diodes 118 and 119. Also associated with operational amplifier 113 are shunt resistor 114 and resistor 115 which terminates at ground.

The signal then passes through resistor 120 to operational amplifier 121. Operational amplifier 121 has associated with it the parallel combination of resistor 126, capacitor 127, and zener diodes 128 and 129. Operational amplifier 121 also has associated with it shunt resistor 122 as well as resistor 123 which terminates at ground.

The signal then reaches operational amplifier 132 through resistor 130. Associated with operational amplifier are shunt resistor 131 and resistor 134 which leads to ground.

Another branch of the circuit leading from operational amplifier 132 passes through potentiometer 139 to reach operational amplifier 137. Also associated with operational amplifier 137 is shunt resistor 138 and resistor 151 which leads to ground. After leaving operational amplifier 137, the signal proceeds to resistor 81 and from there to element 79 of FIG. 5.

Figure 7:
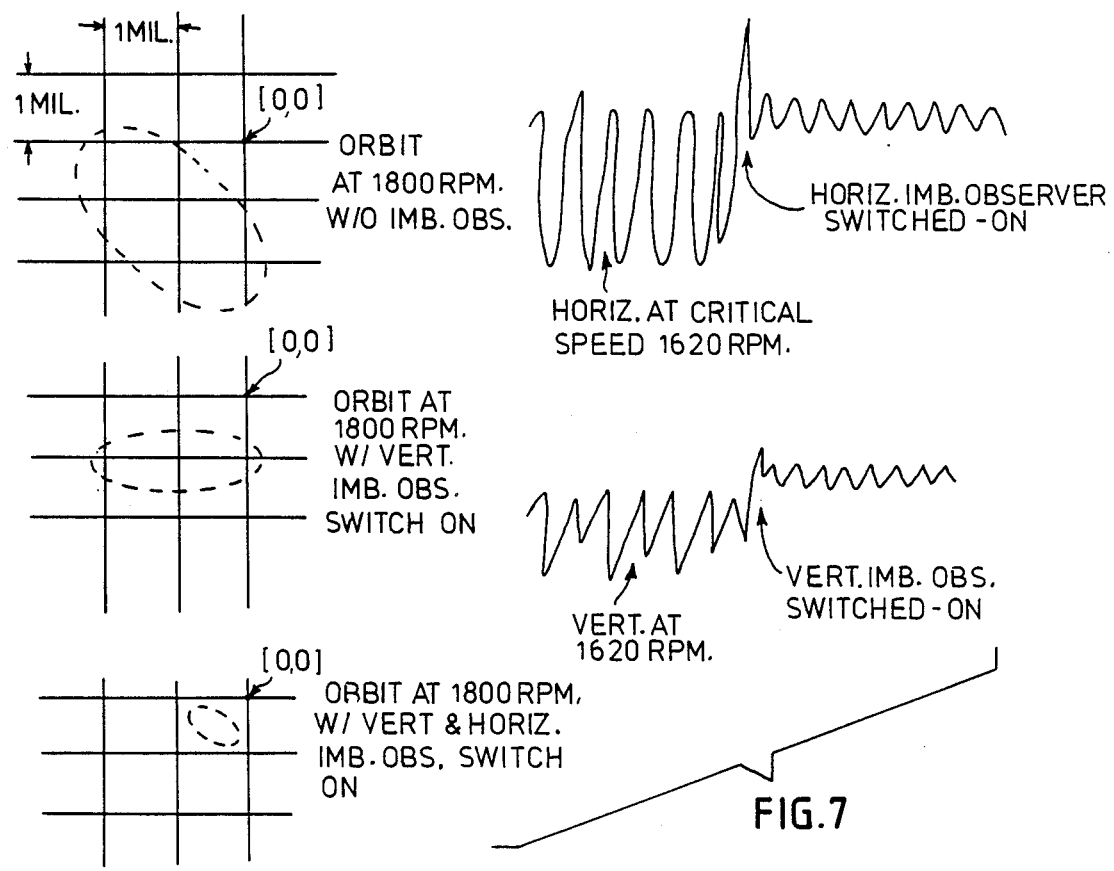
FIG. 7 shows several graphs of test results obtained when an imbalance observer was switched on-line to suppress excessive vibration amplitude.

FIG. 7 is a series of graphs showing the experimental results indicating the effects of imbalance observer feedback control. The experimental device is rotating at its horizontal critical speed at 1800 rpm. Then, the imbalance observer was switched on-line to suppress the vibration amplitude both first in the vertical and then in the vertical and horizontal directions. There is also a gain associated with this optional feedback.

As noted previously, the vibration suppressing capability of the imbalance observer circuit is not limited to synchronous vibration but is effective in dampening subsynchronous vibration because it observes the journal acceleration with no discrimination of dynamic frequencies.

It is to be understood that the invention is not limited to the specific features shown, but that the means, method and construction herein disclosed comprise a preferred form of several modes of putting the invention into effect. The invention is, therefore, claimed in any of the forms or modifications within legitimate and valid scope of the appended claims.

What is claimed is:

1. A system for stabilizing a journal in the magnetic field of an attractive type active magnetic bearing including coil means comprising:
    means for sensing a displacement of said journal;
    means for measuring control current;
    a velocity observer circuit connected to said sensing means comprising integrators and functioning to feedback control signals based on said journal displacement and said control current; and driver circuitry connected to said velocity observer circuit and functioning to apply said feedback control signals to said coil means.

2. The system of claim 1 wherein said velocity observer circuit includes a velocity feedback loop having the output of said velocity observer circuit as input and providing a variable gain output whereby the damping ratio of said journal's natural vibration mode can be varied.

3. The system of claim 1 further comprising an imbalance observer circuit which comprises integrators and functions to recreate said journal's acceleration from said journal displacement and has a variable gain output for suppressing said journal's vibration.

4. The system of claim 3 wherein said imbalance observer circuit can be used on-line and off-line in feedback control of said journal.

* * * * *